R. W. McLEAN.
COTTON SEED HULLER.
APPLICATION FILED APR. 11, 1912.

1,079,657.

Patented Nov. 25, 1913.

2 SHEETS—SHEET 1.

R. W. McLEAN.
COTTON SEED HULLER.
APPLICATION FILED APR. 11, 1912.

1,079,657.

Patented Nov. 25, 1913.
2 SHEETS—SHEET 2.

UNITED STATES PATENT OFFICE.

ROBERT W. McLEAN, OF BRIDGEWATER, MASSACHUSETTS, ASSIGNOR TO CARVER COTTON GIN COMPANY, OF EAST BRIDGEWATER, MASSACHUSETTS, A CORPORATION OF MASSACHUSETTS.

COTTON-SEED HULLER.

1,079,657.  Specification of Letters Patent.  Patented Nov. 25, 1913.

Application filed April 11, 1912. Serial No. 690,140.

*To all whom it may concern:*

Be it known that I, ROBERT W. MCLEAN, a citizen of the United States, and resident of Bridgewater, in the county of Plymouth and State of Massachusetts, have invented new and useful Improvements in Cotton-Seed Hullers, of which the following is a specification.

This invention relates to a cotton seed huller, and particularly to a cotton seed huller of the type known as a bar huller.

The invention resides in the improvements hereinafter described and claimed, in the form and construction of the knives; in the arrangement of the knives upon the cylinder and concave, which may collectively be termed the knife carriers; in the mode of securing the knives to the knife carriers; in the interchangeability of the knives one with another on the same knife carrier, and of the knives of the cylinder with those of the concave; in the construction of the cylinder and of the concave; in the adjustability of the concave bodily and uniformly with relation to the cylinder, and the means for effecting such adjustment; in a safety device by which the machine may be saved from injury in case a foreign substance finds its way between the cylinder and concave; and in certain other novel and improved features, all as hereinafter described and particularly pointed out in the claims.

Figure 1:
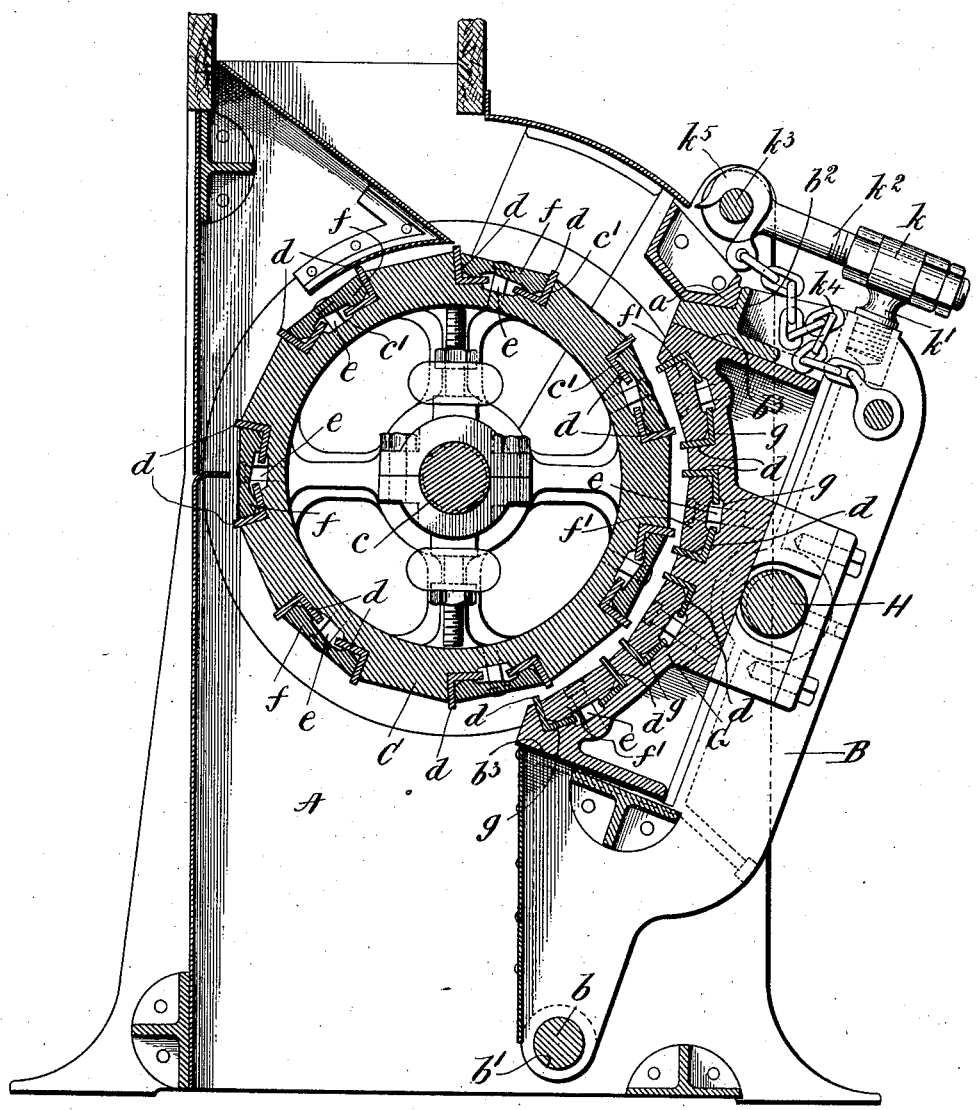
Figure 2:
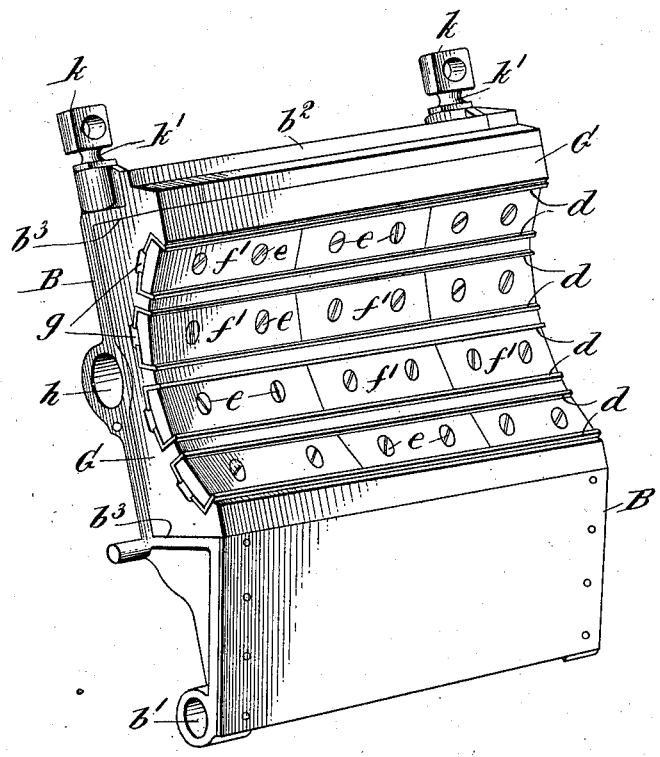

In the accompanying drawings, which illustrate one embodiment of the invention,—Figure 1 is a vertical, sectional view of a cotton seed huller containing the invention; and Fig. 2 is a perspective view of the concave and the swinging yoke in which the concave is mounted.

Referring to the drawings: A represents the base or main frame of the machine on which the other parts are mounted, and B represents the swinging frame or yoke, carrying the concave, pivoted to the main frame A on shaft $b$, which is supported at its ends in the main frame A and extends through bearing sockets $b'$ in the yoke B. A bar $a$ extends across the main frame from side to side, and acts as a stop to engage a corresponding bar $b^2$ of the yoke B limiting the extent of the movement of yoke B in the direction of the cylinder and preventing the knives of the cylinder and of the concave from striking, even when adjusted closest together.

The cylinder is shown at C, fast on shaft $c$, journaled in the frame A, and driven by a belt and pulley (not shown) in the usual way. The cylinder C is provided with a number of knife receiving channels $c'$ extending lengthwise of the cylinder parallel to its axis. Within each such channel $c'$ are a pair of knives $d$ of angular cross section, the two blades of each knife preferably being at right angles with each other, as shown, and each blade having a squared outer edge thus furnishing two sharpened edges on each blade, or four sharpened edges for each knife. The edges of the knives are preferably case hardened in order to preserve their sharp edges as long as possible. The corners of the channels $c'$ are rectangular to fit the angular knives, and said knives are arranged in pairs within the channels, with one blade of each knife bearing against the side wall of the channel and the other blade against the bottom wall of the channel. The opposed blades of each pair lying against the bottom of the channel do not meet but are spaced apart sufficiently to admit between them screws or bolts $e$, which pass through clamps $f$ and into the cylinder. Each clamp $f$ consists of a bar, or series of bars arranged end to end, common to both knives in the same channel, overlying the blades which bear against the bottom wall of the channel. Each clamp is also shaped and proportioned so as to engage and support the blades which bear against the side walls of the channel. Thus a single clamp, common to both knives of each pair, detachably holds and supports said knives in place within the channel. As the two angular blades of each knife are identical, and as all of said knives and their channels are identical, said knives are interchangeable, and each may be reversed back from front and end for end, whereby any one of said four sharpened edges may be brought into operative position; and when one edge becomes dulled another may be brought into action until all four have been used, whereupon the knife may be discarded and a new one substituted. Thus the necessity of grinding the blades, as has heretofore been the practice, may be dispensed with, not only saving much time but insuring the preservation of the perfect balance of the cylinder, which is necessary in view of the high speed of rotation of the cylinder, and which is often disturbed by the frequent grinding of the knives. It will be observed that the operative blades of said knives $d$ instead of being arranged in radial planes on the cylinder are slightly inclined from radial position in a direction opposite to the direction of rotation of the cylinder, thus presenting to the concave knives a forward salient cutting edge.

The swinging frame or yoke B is provided with slideways $b^3$. Mounted in said slide-ways is the concave G, adjustable bodily toward and away from the cylinder. The concave is provided with lengthwise extending knife receiving channels $g$ similar in general character and purpose to the channels $c'$, and each containing a pair of knives $d$, angular in cross section, and identical in all respects to the knives $d$ of the cylinder. Said knives are secured in place by clamping bars $f'$, similar to clamping bars $f$ of the cylinder, detachably fastened by screws or bolts $e$, which pass through said clamping bars $f'$, between the opposed edges of the blades lying against the bottom of channels $g$, and into the concave G. The knives of the concave are reversible as already described with reference to the cylinder blades, to bring into action any one of four different edges and as all the knives are identical, the cylinder blades and the concave blades are freely interchangeable.

In hullers heretofore used, in order to adjust the concave knives with relation to the cylinder knives, it has been the custom to adjust each knife individually, and when brought to its proper adjusted position, to secure each knife individually,—a process requiring some skill, and much time, during which the huller had to be stopped, as it was not practicable to effect such individual adjustments while the machine was running. With my machine as all the concave knives are carried by the solid concave G movable in slideways, they may all be adjusted together, equally and uniformly, by adjusting the concave and such adjustment may be made without stopping the machine. The means for effecting the adjustment as herein shown consist of an eccentric shaft H, journaled at its ends in the sides of yoke B, with its eccentric portion working in bearings $h$ of the concave. By turning eccentric shaft H the concave may be caused to slide on its slide-ways toward and away from the cylinder, thus affording a simple, quick and accurate means of adjustment which can be operated while the machine is running and will insure equal and uniform adjustment of the concave throughout its whole extent. When the eccentric has moved the concave to the forwardmost position possible toward the cylinder, the stop $a$ will still hold the knives of the concave out of the path of the knives of the cylinder, thus rendering it impossible for the knives to meet in any adjustment of the machine.

It not infrequently happens in the operation of hullers that a foreign substance such as a nut or bolt or some other hard article comes into the machine with the cotton seed being treated, and becomes jammed between the cylinder and the concave, breaking the cylinder or the concave or the yoke or some important part of the machine. To obviate this danger I provide a supporting connection between the pivoted yoke B and the frame A, including a relatively weak element adapted to break before other parts of the machine, in case such foreign substance comes into the machine, tending to force the cylinder and concave apart and break the machine. In the form herein shown such connection consists of a pair of safety studs $k$, mounted on top of the yoke B, each having a relatively weak and slender neck $k'$. Extending through a socket in each stud $k$ is a rod $k^2$, hung at its end on cross rod $k^3$ extending from side to side of the main frame A. Studs $k$ are fastened to said rods $k^2$ by suitable nuts. When a hard foreign substance, which would otherwise break the machine, appears between the cylinder and the concave tending to force them apart, the slender and relatively weak necks $k$ of the safety studs will break before damage is done to other parts of the machine, and permit the yoke B to drop backward on its pivot, separating the concave from the cylinder. In order to prevent the yoke from falling too far a chain $k^4$ is provided, attached at one end to yoke B and provided at its other end with a hook $k^5$ engaging rod $k^3$.

I claim:

1. In a cotton seed huller, a knife carrier, and a plurality of knives of angular cross section detachably and interchangeably secured to said carrier, each knife being also reversible end for end and back for front on said carrier whereby four different edges may be brought into operative position.

2. In a cotton seed huller, a knife carrier and a plurality of knives arranged in pairs, the knives of each pair being detachably secured to said carrier by a common clamp and each knife being of angular cross section and interchangeable with the other knives.

3. In a cotton seed huller, a knife carrier provided with knife receiving channels, a pair of knives of angular cross section in each channel, one blade of each angle knife bearing against the side wall of said channel and the other blade against the bottom wall of said channel, and a clamp to hold said knives in place within the channel.

4. In a cotton seed huller, a knife carrier provided with knife receiving channels, a pair of knives of angular cross section in each channel, one blade of each angle knife bearing against the side wall of said channel and the other blade against the bottom wall of said channel, and a clamp common to both knives overlying the blades bearing against the bottom wall of the channel to hold said knives in place within the channel.

5. In a cotton seed huller, a knife carrier provided with knife receiving channels, a pair of knives of angular cross section in each channel, one blade of each angle knife bearing against the side wall of said channel and the other blade against the bottom wall of said channel, and a clamp consisting of a plate overlying the blades of both knives which bear against the bottom wall of the channel, said plate being separably held in place by screws passing between the last named blades and into the carrier.

6. In a cotton seed huller, a cylinder provided with a plurality of knives of angular cross section detachably and interchangeably secured to said cylinder, and a concave provided with a plurality of knives of angular cross section detachably and interchangeably secured to said concave, the knives of the cylinder and the knives of the concave being identical one with the other, whereby they are interchangeable.

7. In a cotton seed huller, a frame, a cylinder journaled on said frame carrying a plurality of knives, a yoke pivoted to swing on said frame, a concave provided with knives, said concave being adjustable on said yoke toward and away from the cylinder, means to effect such adjustment, and a stop on said frame adapted to arrest the movement of said yoke in the direction of said cylinder, said stop, said means for adjusting the concave on the yoke and said cylinder being relatively so coördinated one to another that when the concave is adjusted on the yoke to its forwardmost position toward the cylinder, the stop will still hold the knives of the concave out of the path of the knives of the cylinder.

8. In combination, a frame, a cylinder journaled on said frame, a yoke carrying a concave pivoted to said frame and adapted to swing away from said cylinder, and connection between said yoke and said frame for supporting the yoke and concave in operative position, said connection including a safety stud having a relatively weak and slender neck adapted to break before the other parts of the machine in case a foreign substance forces the cylinder and concave apart, and a flexible connection adapted to limit the extent of the movement of separation of said yoke from said cylinder in case of the breaking of said stud.

Signed by me at Boston, Massachusetts, this second day of April 1912.

ROBERT W. McLEAN.

Witnesses:
 ROBERT CUSHMAN,
 CHARLES D. WOODBERRY.

Copies of this patent may be obtained for five cents each, by addressing the "Commissioner of Patents, Washington, D. C."